C. F. DUNDERDALE.
Carbureter.
No. 100,274. Patented March 1, 1870.
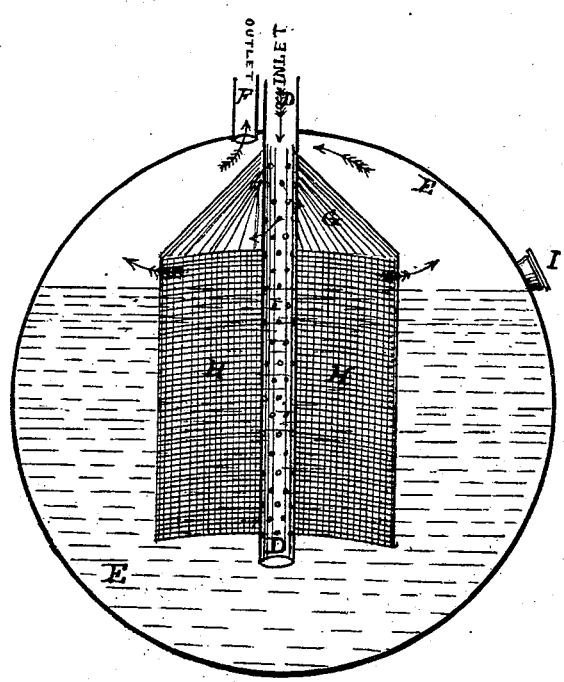
Witnesses
J. L. Watson
H. Eitenbenz
Inventor
Cleaveland F. Dunderdale

United States Patent Office.

CLEAVELAND F. DUNDERDALE, OF NEW YORK, N. Y.

Letters Patent No. 100,274, dated March 1, 1870.

IMPROVED CARBURETER.

The Schedule referred to in these Letters Patent and making part of the same.

*To all whom it may concern:*

Be it known that I, CLEAVELAND F. DUNDERDALE, of the city, county, and State of New York, have invented certain Improvements in Carbureters for Attachment to Gas-Fixtures, &c.; and that the same having been secured to me in Letters Patent of the United States, numbered 90,436, and dated the 25th day of May, 1869; and that I have made further improvements thereon; that I hereby declare that the following is a full, clear, and exact description thereof, which will enable others skilled in the art to make and use the same, to wit:

The nature of my improvements consists in providing the interior of the carbureting chamber connected with the fixture with a texture suitable for inducing capillary attraction, which hangs suspended partly in the body of the hydrocarbon liquid therein contained, and partly above its surface, so that the heated air may be forced to pass through it, thus volatilizing it, and carrying its vapors with it to the burners; also to enable the said chamber to be partially filled with the liquid, and to keep the said texture fully saturated as long as any of the liquid remains therein.

Be it understood that I do not claim the placing of an absorbent in the chamber as new, as the same is known and in use; but I do claim the particular application and arrangement of the curtain for inducing capillary attraction surrounding the perforated tube, as hereinafter more fully described.

The drawing annexed forms part of this specification and the letters of reference marked thereon.

E in the drawing shows the carbureting chamber, with the pipe D passing down its center to a point near the bottom, with its sides perforated with holes for the egress of the heated air.

G is an inverted funnel, commencing with the uppermost holes, and extending downward to a line parallel to the surface of the liquid, but above it, the liquid being prevented from rising above the level of the opening for filling, marked I.

Suspended from the edges of the inverted funnel G is a curtain, made of coarse fabric, suitable for inducing capillary attraction, and completely surrounding the perforated tube D, its edges always being under the liquid surface as long as any liquid remains in the chamber.

The action is described as follows:

The heated air entering the tube D passes down and out through the perforations, meeting with no hydraulic resistance. It then forces its way through the saturated curtain surrounding, as shown by the arrows. The oxygen being heated combines with the carbon, thus forming carbonic oxide gas, and the nitrogen carries off the vapor, which, mixing together, passes on through the outlet tube F to the burners, where it is consumed.

Having thus described my invention,

What I claim as new, and desire to secure by Letters Patent, is—

The combination and arrangement of the perforated tube D, the cover or funnel G, the curtain H, encircling the perforated tube D with the inlet and outlet tubes, and with the liquid contained in the chamber E with each other, and that patented to me as aforesaid, for the purpose as herein set forth, shown, and described.

CLEAVELAND F. DUNDERDALE.

Witnesses:
    J. S. WATSON,
    A. EITENBENZ.